United States Patent
Shi et al.

(10) Patent No.: US 12,034,546 B2
(45) Date of Patent: *Jul. 9, 2024

(54) DOWNLINK DATA TRANSMISSION METHOD, TERMINAL DEVICE, AND STORAGE MEDIUM

(71) Applicant: GUANGDONG OPPO MOBILE TELECOMMUNICATIONS CORP., LTD., Dongguan (CN)

(72) Inventors: Zhihua Shi, Dongguan (CN); Wenhong Chen, Dongguan (CN); Yun Fang, Dongguan (CN); Yingpei Huang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 82 days.

This patent is subject to a terminal disclaimer.

(21) Appl. No.: 17/833,416

(22) Filed: Jun. 6, 2022

(65) Prior Publication Data
US 2022/0303062 A1  Sep. 22, 2022

Related U.S. Application Data

(63) Continuation of application No. 17/468,009, filed on Sep. 7, 2021, now Pat. No. 11,368,258, which is a
(Continued)

(51) Int. Cl.
*H04W 72/04* (2023.01)
*H04L 1/1812* (2023.01)
(Continued)

(52) U.S. Cl.
CPC .......... *H04L 1/1819* (2013.01); *H04L 5/0051* (2013.01); *H04W 72/0446* (2013.01); *H04W 72/23* (2023.01)

(58) Field of Classification Search
CPC ........... H04W 72/042; H04W 72/0446; H04W 72/1289; H04W 72/1273; H04L 1/1819; H04L 5/0051
See application file for complete search history.

(56) References Cited

U.S. PATENT DOCUMENTS

2018/0091276 A1   3/2018 Huang et al.
2019/0082456 A1   3/2019 Kim et al.
(Continued)

FOREIGN PATENT DOCUMENTS

CN   102752083 A   10/2012
CN   109076364 A   12/2018
(Continued)

OTHER PUBLICATIONS

First Office Action issued in corresponding Canadian application No. 3,134,619, dated Nov. 18, 2022.
(Continued)

*Primary Examiner* — Wei Zhao
(74) *Attorney, Agent, or Firm* — BAYES PLLC

(57) ABSTRACT

Disclosed is a downlink data transmission method, including determining, by a terminal device, a transmission configuration indicator (TCI) state corresponding to downlink data transmission based on downlink control information (DCI); and determining a redundancy version (RV) value corresponding to the downlink data transmission based on the DCI. The TCI state and the RV value are used for the terminal device to receive downlink data. Embodiments of the present disclosure also provide a terminal device and a storage medium.

20 Claims, 8 Drawing Sheets

Related U.S. Application Data continuation of application No. PCT/CN2019/080256, filed on Mar. 28, 2019.

(51) Int. Cl.
*H04L 5/00* (2006.01)
*H04W 72/0446* (2023.01)
*H04W 72/23* (2023.01)

(56) References Cited

U.S. PATENT DOCUMENTS

| | | | |
|---|---|---|---|
| 2020/0106566 A1* | 4/2020 | Yeo | H04W 28/04 |
| 2020/0267748 A1* | 8/2020 | Khoshnevisan | H04B 7/024 |
| 2020/0374960 A1* | 11/2020 | Deenoo | H04W 72/14 |

FOREIGN PATENT DOCUMENTS

| | | | |
|---|---|---|---|
| CN | 109327905 A | 2/2019 | |
| CN | 109792344 A | 5/2019 | |
| WO | 2017194022 A1 | 11/2017 | |
| WO | 2018204863 A1 | 11/2018 | |
| WO | 2019032882 A1 | 2/2019 | |
| WO | 2020003525 A1 | 1/2020 | |

OTHER PUBLICATIONS

First Office Action issued in corresponding European application No. 19921594.8, dated Nov. 29, 2022.
Notice of Allowance issued in corresponding Chinese application No. 202111229027.4, dated Dec. 12, 2022.
First Office Action issued in corresponding Japanese application No. 2021-557424, dated Feb. 3, 2023.
First Office Action issued in corresponding Chinese application No. 202111229027.4, dated Sep. 15, 2022.
NTT Docomo, Inc., "Enhancements on multi-TRP/panel transmission", R1-1813333, 3GPP TSG RAN WG1 Meeting #95 Spokane, USA, Nov. 12-16, 2018.
International Search Report issued in corresponding International Application No. PCT/CN2019/080256, dated Dec. 11, 2019, 37 pages.
PCT Written Opinion of the International Searching Authority issued in corresponding International Application No. PCT/CN2019/080256, dated Dec. 11, 2019, 8 pages.
Extended European Search Report issued in corresponding European Application No. 19921594.8, dated Feb. 24, 2022, 11 pages.
First Office action issued in corresponding India Application No. 202117043567, dated Apr. 1, 2022, 6 pages.
"On multi-TRP and multi-panel", Agenda: 7.2.8.2, Source: Ericsson, 3GPP TSG RAN WG1 Meeting Ad-Hoc Meeting 1901, R1-1900728, Taipei, Taiwan, Jan. 21-25, 2019, 9 pages.
"Enhancements on multi-TRP/panel transmission", Agenda Item: 7.2.8.2, Source: Huawei, HiSilicon, 3GPPTSG RAN WGI Ad-Hoc Meeting 1901, RI-1900017, Taipei, Jan. 21-25, 2019, 15 pages.
"Summary of AI: 7.2.8.2 Enhancements on Multi TRP/Panel Transmission of Offline Discussion", Agenda Item: 7.2.8.2 Source: Huawei, HiSilicon, 3GPP TSG RAN WG1 Meeting #96 R1-1903541, Athens, Greece, Feb. 25-Mar. 1, 2019, 59 pages.
"3rd Generation Partnership Project; Technical Specification Group Radio Access Network; NR—Multiplexing and channel coding (Release 15)", 3GPP TS 38.212 V15.5.0 (Mar. 2019), 101 pages.
3rd Generation Partnership Project; Technical Specification Group Radio Access Network; NR—Physical layer procedures for data (Release 15), 3GPP TS 38.214 V15.5.0 (Mar. 2019), 103 pages.
Second Office Action issued in corresponding Canadian application No. 3,134,619, dated Aug. 23, 2023.
First Office Action issued in corresponding Vietnamese application No. 1-2021-06083, dated Aug. 24, 2023.

* cited by examiner

DOWNLINK DATA TRANSMISSION METHOD, TERMINAL DEVICE, AND STORAGE MEDIUM

CROSS-REFERENCE TO RELATED APPLICATION

This is a continuation application of U.S. patent application Ser. No. 17/468,009, filed on Sep. 7, 2021, which is a continuation of International Application No. PCT/CN2019/080256, filed on Mar. 28, 2019, the entire contents of which are incorporated herein by reference in their entirety.

BACKGROUND

The present disclosure relates to the field of wireless communication technologies, and more particularly, to a downlink data transmission method, a terminal device, and a storage medium.

In a New Radio (NR) system, multiple transmission reception points (TRP), or multiple antenna panels, or multiple beams simultaneously transmit downlink data to a terminal device in some scenes. The terminal device may obtain, by detecting a physical downlink control channel (PDCCH), downlink control information (DCI) indicating relevant indication information regarding simultaneously transmitting data through multiple TRPs, multiple antenna panels, or multiple beams. In the related art, downlink data transmission includes three implementation modes, that is, data transmission on multiple slots by one TRP, data transmission by multiple TRPs, and data transmission on multiple slots by multiple TRPs. However, there has no solution for transmitting the downlink data yet when the downlink data transmission mode is changed or when these data transmission modes are mixed for use.

SUMMARY

Embodiments of the present disclosure provide a downlink data transmission method, a terminal device, and a storage medium to solve the above technical problems, so that the terminal device may achieve the switching between different downlink data transmission modes or a combination of different downlink data transmission modes based on the DCI.

In a first aspect, embodiments of the present disclosure provide a downlink data transmission method, including determining, by a terminal device, a transmission configuration indicator (TCI) state corresponding to downlink data transmission based on downlink control information; determining, by the terminal device, a redundancy version (RV) value corresponding to the downlink data transmission based on the downlink control information; and receiving, by the terminal device, downlink data based on the TCI state and the RV value.

In a second aspect, embodiments of the present disclosure provide a terminal device, including a processing unit, configured to determine a transmission configuration indication state corresponding to downlink data transmission based on downlink control information: and determine a redundancy version value corresponding to the downlink data transmission based on the downlink control information; and a transceiver unit, configured to receive downlink data based on the transmission configuration indication state and the redundancy version value.

In a third aspect, embodiments of the present disclosure provide a terminal device, including a processor and a memory for storing a computer program running on the processor, wherein the processor is configured to execute steps of the above downlink data transmission method executed by the terminal device when running the computer program.

In a fourth aspect, embodiments of the present disclosure provide a storage medium that stores an executable program, and when the executable program is executed by a processor, the downlink data transmission method executed by the terminal device described above is implemented.

DETAILED DESCRIPTION

In order to understand features and technical content of embodiments of the present disclosure in more detail, implementations of the embodiments of the present disclosure will be described in detail below with reference to the accompanying drawings. The accompanying drawings are only for purposes of reference and explanation, and are not used for limiting the embodiments of the present disclosure.

Before describing the embodiments of the present disclosure in detail, a brief instruction of downlink data transmission related content is first given.

Figure 1:
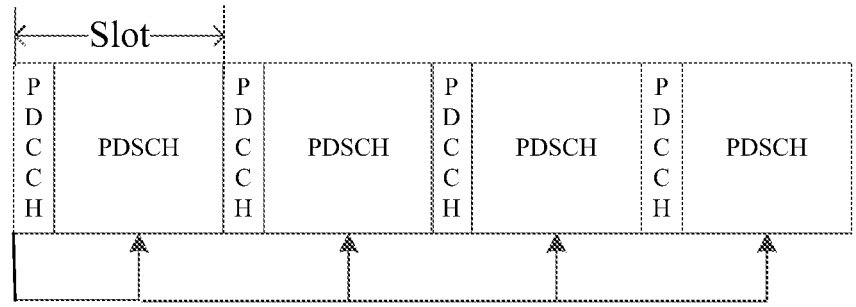
FIG. 1 is a schematic diagram of a downlink data transmission mode of the present disclosure.
Figure 2:
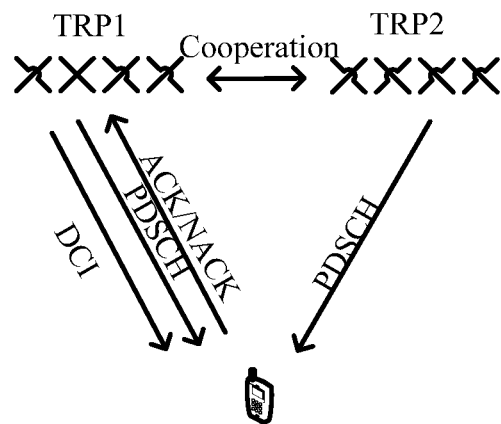
FIG. 2 is a schematic diagram of another downlink data transmission mode of the present disclosure.
Figure 3:
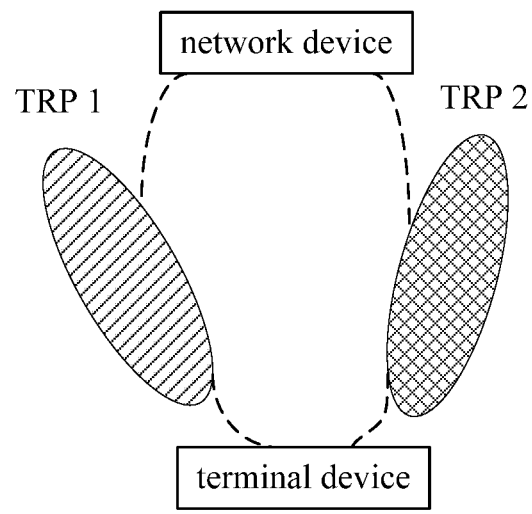
FIG. 3 is a schematic structural diagram illustrating simultaneously transmitting data through multiple TRPs of the present disclosure.
Figure 4:
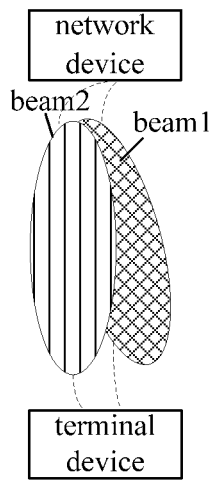
FIG. 4 is a schematic structural diagram illustrating simultaneously transmitting data through multiple beams of the present disclosure.

In a NR system, a downlink data transmission mode as shown in FIG. 1 may be used to transmit data on multiple slots through a TRP; another downlink data transmission mode as shown in FIG. 2 may also be used to transmit data through multiple TRPs; data may also be transmitted on the multiple slots through multiple TRPs. A structural diagram of simultaneously transmitting data through multiple TRPs is shown in FIG. 3, in which TRP1 and TPR2 are used to simultaneously transmit data between a network device an a terminal device; a structural diagram of simultaneously transmitting data through multiple beams is shown in FIG. 4, in which beam1 and beam2 are used to transmit data between the network device and the terminal device. In addition to detecting one PDCCH by the terminal device to obtain one DCI indicating that data is simultaneously transmitted through multiple TRPs, multiple antenna panels, or multiple beams, an optional scheme of simultaneously transmitting data through multiple TRPs, multiple antenna panels, or multiple beams also includes receiving, by the terminal device, different PDCCHs from different TRPs, or different antenna panels, or different beams, and detecting corresponding DCI on each PDCCH, and each DCI indicates relevant indication information of a corresponding data transmission mode.

For a scene in which the terminal device obtains, by detecting one PDCCH, one DCI indicating simultaneously transmitting data through multiple TRPs, multiple antenna panels, or multiple beams, the terminal device only needs to detect one PDCCH, so detection complexity of control channel is low. However, there in a need to quickly exchange information between different antenna panels/TRPs/beams.

For a scene in which the terminal device receives different PDCCHs from different TRPs, or different antenna panels, or different beams, and detects corresponding DCI on each PDCCH, the terminal device needs to simultaneously detect multiple PDCCHs on the same carrier, which increases the complexity, but may improve flexibility and robustness.

The scene in which the terminal device receives different PDCCHs from different TRPs. or different antenna panels, or different beams, and detects corresponding DCI on each PDCCH at least includes the following:

1. The multiple TRPs belong to a same cell, and a backhaul between TRPs is ideal (that is, rapid information exchange and dynamic information exchange may be carried out).

2. The multiple TRPs belong to the same cell, and the backhaul between TRPs is not ideal (that is, exchange information between TRPs cannot be carried out quickly, and can only be carried out relatively slowly).

3. The multiple TRPs belong to different cells, and the backhaul between TRPs is ideal.

4. The multiple TRPs belong to different cells, and the backhaul between TRPs is not ideal.

5. The multiple beams/antenna panels belong to the same cell, and a backhaul between beams/antenna panels is ideal (that is, rapid information exchange and dynamic information exchange may be carried out).

6. The multiple beams/antenna panels belong to the same cell, and the backhaul between beams/antenna panels is not ideal (that is, exchange information between TRPs cannot be carried out quickly, and can only be carried out relatively slowly).

7. The multiple beams/antenna panels belong to different cells, and the backhaul between beams/antenna panels is ideal.

8. The multiple beams/antenna panels belong to different cells, and the backhaul between beams/antenna panels is not ideal.

The following briefly describes Quasi Co-location (QCL) indication for the downlink data transmission.

In order to improve receiving performance, upon receiving data, the terminal device may utilize characteristics of transmission environment corresponding to the data transmission to improve a receiving algorithm. For example, statistical characteristics of a channel may be used to optimize a design and parameters of a channel estimator. In the NR system, these characteristics corresponding to the data transmission are represented by QCL information (QCL-Info).

If the downlink transmissions come from different TRPs/antenna panels/beams, the characteristics of the transmission environment corresponding to the data transmissions may also change. Therefore, in the NR system, when transmitting the downlink control channel or a data channel, the network device indicates the corresponding QCL-Info state information to the terminal through a transmission configuration indicator (TCI) state. The TCI state may contain a TCI-state ID used to identify a TCI state, QCL information 1 and optional QCL information 2, where one of the QCL information further contains the following information: 1) QCL type configuration that may be one of QCL type A, QCL type B, QCL type C or QCL type D; 2) QCL reference signal configuration. The QCL reference signal configuration includes an identification (ID) of a cell where the reference signal is located, a bandwidth part (BWP) ID, and a reference signal identification; the reference signal identification may be a channel state information-reference signal (CSI-RS) resource ID or a synchronization signal block (SSB) index.

In the case that it is configured in both the QCL information 1 and the QCL information 2 that the QCL type of at least one QCL information needs to be one of typeA, typeB, and typeC, if another QCL information is to be configured, the QCL type of that QCL information must be QCL type D. Definitions of different QCL type configurations are as follows:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

Relevant configuration in the existing protocol 38.331 is as follows:

```
TCI-State ::=                SEQUENCE {
    tci-StateId                  TCI-StateId,
    qcl-Type1                    QCL-Info,
    qcl-Type2                    QCL-Info        OPTIONAL,  --
Need R
    ...
}
QCL-Info ::=                 SEQUENCE {
    cell                         ServCellIndex   OPTIONAL,  --
Need R
    bwp-Id                       BWP-Id          OPTIONAL, --
Cond CSI-RS-Indicated
    referenceSignal              CHOICE {
        csi-rs                       NZP-CSI-RS-ResourceId,
        ssb                          SSB-Index
    },
    qcl-Type                     ENUMERATED {typeA, typeB, typeC,
typeD},
    ...
}
```

The following is a brief description of the TCI state.

In the NR system, the network device may indicate a corresponding TCI state for a downlink signal or a downlink channel. If the network device configures, through the TCI state, a QCL reference signal of a target downlink channel or a target downlink signal as a reference SSB or a reference CSI-RS resource, and configures the QCL type as typeA, typeB, or typeC, then the terminal device may assume that a large-scale parameter of the target downlink signal and the reference SSB or reference CSI-RS resource are the same, and the large-scale parameter is determined by the QCL type configuration. Similarly, if the network device configures, through the TCI state, the QCL reference signal of the target downlink channel or the downlink signal as the reference SSB or the reference CSI-RS resource, and configures the QCL type as typeD, the terminal device may use a receiving beam same as that receiving the reference SSB or the reference CSI-RS resource (i.e., Spatial Rx parameter) to receive the target downlink signal. Typically, the target downlink channel (or the target downlink signal) and its reference SSB or reference CSI-RS resource are transmitted by the same TRP or the same antenna panel or the same beam on a network device side. If the transmission TRPs or transmission antenna panels or transmitting beams of two downlink signals or downlink channels are different, different TCI states are usually configured.

Figure 5:
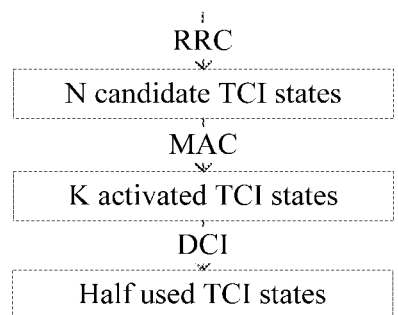
FIG. 5 is a schematic diagram illustrating a configuration method of a TCI state of the present disclosure.

For the downlink control channel, the TCI state may be indicated through a radio resource control (RRC) signaling or a combination of the RRC signaling and a media access control (MAC) signaling. For the downlink data channel, a configuration method for the TCI state is shown in FIG. 5. An available TCI state set is indicated through the RRC signaling: some of the TCI states in the set are activated through the MAC signaling; and finally one or two TCI states among the activated TCI states are indicated through a TCI state indication field in the DCI, and are used for the PDSCH scheduled by the DCI.

The following briefly describes a demodulation reference signal (DMRS). In NR, there are two types of DMRS: 1. DMRS of Type 1, including the following attributes: a. Supporting two code division multiplexing (CDM) groups: b. Supporting at most four DMRS ports if one orthogonal frequency division multiplexing (OFDM) symbol is occupied, among the ports, ports {0, 1} belong to CDM group 0, and ports {2, 3} belong to CDM group 1; c. Supporting at most eight DMRS ports if two OFDM symbols are occupied, among the ports, ports {0, 1, 4, 5} belong to CDM group 0, and ports {2, 3, 6, 7} belong to CDM group 1, 2. DMRS of Type 2, including the following attributes: a. Supporting three CDM groups; b. Supporting at most six DMRS ports if one OFDM symbol is occupied, among the ports, ports {0, 1} belong to CDM group 0, ports {2, 3} belong to CDM group 1, and ports {4, 5} belong to CDM group 2; c. Supporting at most twelve DMRS ports if two OFDM symbols are occupied, among the ports, ports {0, 1, 6, 7} belong to CDM group 0, ports {2, 3, 8, 9} belong to CDM group 1, and ports {4, 5, 10, 11} belong to CDM group 2.

When transmitting the downlink data, the network device indicates the terminal device which ports are used for this transmission. If the data is transmitted from different TRPs/antenna panels/beams, the ports in the same CDM group will be sent from one TRP/panel/beam: therefore, the corresponding characteristics will be similar to ('QCL-TypeA'. 'QCL-TypeB', 'QCL-TypeC', 'QCL-TypeD'): correspondingly, they may correspond to the same TCI state. In contrast, different CDM groups may be transmitted from different TRPs/antenna panels/beams, and may correspond to different TCI states.

The downlink data transmission method in the embodiments of the present disclosure may be applied to transmit downlink data for multiple times. For example, the PDSCH transmission is repeated to improve the transmission reliability of PDSCH, that is, the PDSCHs carrying the same data are transmitted multiple times through different slots/TRPs/antenna panels/beams/redundancy versions (RV), thereby obtaining diversity gain and reducing the probability of false detection (BLER).

The present disclosure provides a downlink data transmission method. The downlink data transmission in the embodiments of the present disclosure may be applied to a variety of communications systems, such as a Global System for Mobile communications ("GSM" for short) system, a Code Division Multiple Access ("CDMA" for short) system, a Wideband Code Division Multiple Access ("WCDMA" for short) system, a General Packet Radio Service ("GPRS" for short), a Long Term Evolution ("LTE" for short) system, an LTE Frequency Division Duplex ("FDD" for short) system, an LTE Time Division Duplex ("TDD" for short), a Universal Mobile Telecommunication System ("UMTS" for short), a Worldwide Interoperability for Microwave Access ("WiMAX" for short) communications system, a future 5G system, or the like.

Figure 6:
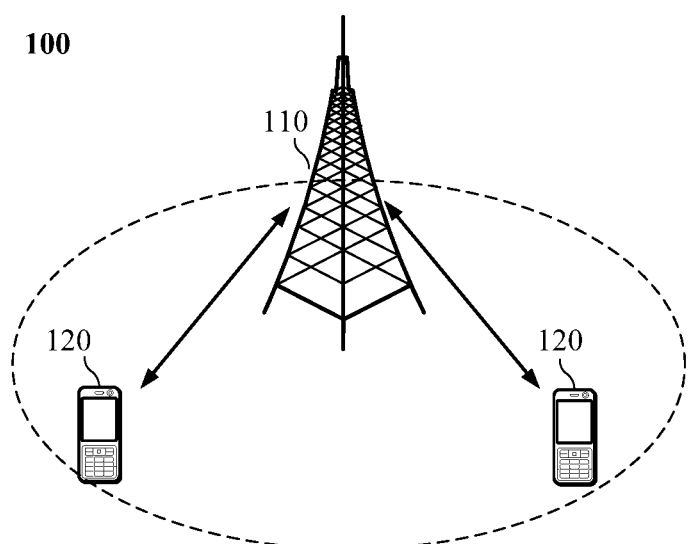
FIG. 6 is a schematic diagram illustrating a composition structure of a communication system of an embodiment of the present disclosure.

For example, a communication system 100 to which an embodiment of the present disclosure is applied is shown in FIG. 6. The communication system 100 may include a network device 110. The network device 110 may be a device communicating with terminal device 120 (or referred to as a communication terminal or a terminal). The network device 110 may provide communication coverage to a specific geographic region, and may communicate with terminal devices located within the coverage region. Optionally, the network device 110 may be a base transceiver station (BTS) in a global system for mobile communications (GSM) or a code division multiple access (CDMA) system, or a nodeB (NB) in a wideband code division multiple access (WCDMA) system, or an evolutional node B (eNB or eNodeB) in a long term evolution (LTE) system, or a gNB in a new radio (NR)/5G system, or a radio controller in a cloud radio access network (CRAN). Or, the network device may be a mobile switching center, a relay station, an access point, a vehicle-mounted device, a wearable device, a concentrator, a switchboard, a network bridge, a router, a network-side device in a 5th generation (5G) network, or a network device in a public land mobile network (PLMN) that will be evolved in the future, and the like.

The communication system 100 further includes at least one terminal device 120 located within the coverage range of the network device 110. The "terminal device" used herein includes, but not limited to, connection via a wired line, such as connection via public switched telephone networks (PSTN), a digital subscriber line (DSL), a digital cable, and a direct cable; and/or another data connection/network; and/or via a wireless interface, for example, for a cellular network, a wireless local area network (WLAN), a digital television network such as a DVB-H network, a satellite network and an AM-FM broadcast transmitter; and/or an apparatus of another UE, which is configured to receive/transmit a communication signal; and/or an Internet of things (IoT) device. The terminal device configured to realize communication through a wireless interface may be referred to as a "wireless communication terminal", a "wireless terminal", or a "mobile terminal". Examples of the mobile terminal include, but not limited to, a satellite or cellular phone, and a personal communications system (PCS) terminal that may combine a cellular radiotelephone with data processing, facsimile, and data communication capabilities; a radiotelephone, a pager, an Internet/intranet access, a Web browser, a notepad, a calendar, and/or a personal digital assistant (PDA) of a global positioning system (GPS) receiver; and a conventional laptop and/or palmtop receiver or other electronic apparatuses including radiotelephone transceivers. The terminal device may refer to an access terminal, user equipment (UE), a user unit, a user station, a mobile station, a mobile platform, a remote station, a remote terminal, a mobile device, a user terminal, a terminal, a wireless communication device, a user agent, or a user apparatus. The access terminal may be a cellular phone, a cordless telephone, a session initiation protocol (SIP) telephone, a wireless local loop (WLL) station, a PDA, a handheld device having a wireless communication function, a computation device or other processing devices connected to a radio modem, a vehicle-mounted device, a wearable device, a terminal device in a 5G network, or a terminal device in the PLMN that will be evolved in the future, and the like.

Optionally, device to device (D2D) communication may be realized between the terminal devices 120.

Optionally, a 5G system or 5G network may also be referred to as a NR system or NR network.

FIG. 6 exemplarily illustrates one network device and two terminal devices. Optionally, the communication system 100 may include a plurality of network devices, and a coverage range of each network device may include other numbers of terminal devices, which is not limited by the embodiments of the present disclosure.

Optionally, the communication system 100 may further include other network entities such as a network controller and a mobile management entity, which is not limited by the embodiments of the present disclosure.

It should be understood that a device having a communication function in a network/system in the embodiments of the present disclosure may be referred to as a communication device. The communication system 100 shown in FIG. 6 is taken as an example. The communication device may include the network device 110 and the terminal device 120 which have communication functions. The network device 110 and the terminal device 120 may be the above-mentioned specific devices, and descriptions thereof are omitted here. The communication device may also include other devices in the communication system 100, such as other network entities including the network controller, the mobile management entity, and the like, which is not limited by the embodiments of the present disclosure.

Figure 7:
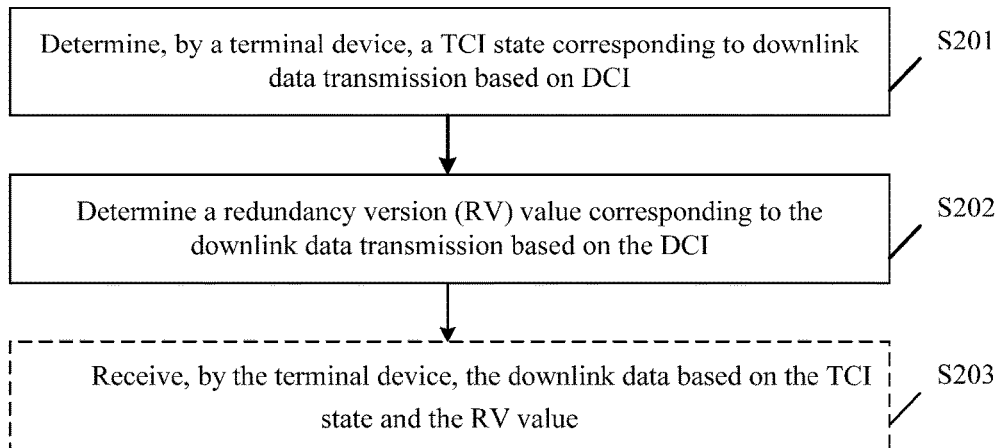
FIG. 7 is a schematic diagram illustrating an optional processing flow of a downlink data transmission method provided by an embodiment of the present disclosure.

As shown in FIG. 7, an optional processing flow of the downlink data transmission method provided by the embodiments of the present disclosure includes steps described below.

In step S201, the terminal device determines a TCI state corresponding to downlink data transmission based on DCI.

In the embodiments of the present disclosure, the DCI is transmitted to the terminal device from the network device, and the DCI includes antenna port indication information and TCI state indication information. Accordingly, the terminal device determines the TCI state corresponding to the downlink data transmission based on the antenna port indication information and the TCI state indication information in the DCI.

In a specific implementation, the terminal device first determines K TCI states corresponding to the present scheduling based on the TCI state indication information in the DCI and K is greater than 1; and then determines, among the K TCI states, a TCI state corresponding to each DMRS port in each downlink data transmission in a time domain according to a DMRS port set to which a DMRS port belongs, where the DMRS port is indicated by the antenna port indication information in the DCI. In this way, the downlink data is simultaneously transmitted from multiple TRPs, which may reduce the number of repetitions in the time domain, thereby reducing system delay.

Description about how to determine the DMRS port set to which the DMRS port belongs are given through an example where there are two TRPs ($N_{TRP}=2$), the number of downlink data transmissions in the time domain M is 4, the number of TCI states K=2, the number of DMRS port sets T=1 or 2 (in some additional description, T=3).

In some embodiments, the DMRS port set to which the DMRS port belongs is determined by the terminal device based on a DMRS CDM group corresponding to the DMRS port indicated by port indication information in the DCI, and a correspondence between the DMRS CDM group and the DMRS port set. For example, the port indication information in the DCI indicates that the DMRS ports correspond to two or three DMRS CDM groups, and the DMRS ports corresponding to different DMRS CDM groups belong to two DMRS port sets (DMRS port set 0 and DMRS port set 1). A relationship between a DMRS CDM group number and the DMRS port set 0/the DMRS port set 1 may be determined by the terminal device according to a predetermined rule, or may be determined by the terminal device according to a configuration signaling transmitted from the network device. Optionally, the relationship between the DMRS CDM group number and the DMRS port set 0/the DMRS port set 1 includes at least one of the following:

1. The DMRS ports corresponding to DMRS CDM group 0 correspond to DMRS port set 0, and the DMRS ports corresponding to DMRS CDM group 1 correspond to DMRS port set 1; or the DMRS ports corresponding to DMRS CDM group 0 correspond to DMRS port set 1, and the DMRS ports corresponding to DMRS CDM group 1 correspond to DMRS port set 0. It may be understood that the DMRS CDM group with a larger number corresponds to the DMRS port set with a larger number; or the DMRS CDM group with the larger number corresponds to the DMRS port set with a smaller number.

2. The DMRS ports of DMRS CDM group 0 and DMRS CDM group 2 correspond to DMRS port set 0, and the DMRS ports of DMRS CDM group 1 correspond to DMRS port set 1; or the DMRS ports of DMRS CDM group 0 and DMRS CDM group 2 correspond to DMRS port set 1, and the DMRS ports of DMRS CDM group 1 corresponds to DMRS port set 0.

3. The DMRS ports of DMRS CDM group 0 correspond to DMRS port set 0, the DMRS ports of DMRS CDM group 1 correspond to DMRS port set 1, and the DMRS ports of DMRS CDM group 2 correspond to DMRS port set 2.

In other embodiments, the DMRS port set to which the DMRS port belongs is determined by the terminal device based on first indication information transmitted from the network device. It may be understood that the network device transmits the first indication information to the terminal device, and the terminal device determines the DMRS port set to which the DMRS port belongs according to the first indication information.

In a specific implementation, when the first indication information is configured, the terminal device determines the DMRS port set to which the DMRS port belongs based on the DMRS CDM group corresponding to the DMRS port indicated by the port indication information in the DCI, and the correspondence between the DMRS CDM groups and the DMRS port sets. For example, true or false is used to indicate whether the first indication information is configured (false is a default value, that is, when the first indication information is not configured, the default value is false). When a corresponding field of the information received by the terminal device is true, it indicates that the first indication information is configured. In this case, the DMRS port set to which the DMRS port belongs is determined based on the foregoing embodiment of the present disclosure.

Alternatively, when the first indication information is configured, the DMRS port set to which the DMRS port belongs is determined by the terminal device based on a first preset strategy. Optionally, the first preset strategy is: DMRS ports included in each DMRS port set. For example, DMRS port set 0 includes DMRS ports x1, x2, . . . . DMRS port set 1 includes DMRS ports y1, y2, . . . ; or DMRS port set 0 includes DMRS ports x1, x2, and DMRS port set 1 includes DMRS port y1.

Alternatively, when the first indication information is not configured, all DMRS ports belong to one DMRS port set. For example, when the corresponding field of the information received by the terminal device is not configured, it means that the first indication information is not configured. In this case, the terminal device determines that all DMRS ports belong to one DMRS port set.

Alternatively, when a value corresponding to the first indication information is a first value, all DMRS ports belong to one DMRS port set. The first value may be flexibly set. For example, the first value is set as 1.

Alternatively, when the value corresponding to the first indication information is a second value, the DMRS port set to which the DMRS indicated by the port indication information in the DCI belongs is determined based on a preset correspondence between a DMRS ports and a DMRS port sets or a preset strategy. The second value may be flexibly set. For example, the second value is set to 0.

Alternatively, the DMRS port set to which the DMRS port belongs is determined by the terminal device based on the first indication information. The first indication information indicates DMRS ports included in each DMRS port set. For example, DMRS port set 0 includes DMRS ports x1, x2, . . . , DMRS port set 1 includes DMRS ports y1, y2, . . . ; or DMRS Port set 0 includes DMRS ports x1 and x2, and DMRS port set 1 includes DMRS ports y1; or DMRS port set 0 includes DMRS ports x1 and x2 (other ports belong to DMRS port set 1 by default).

In the embodiments of the present disclosure, the DMRS port set to which the DMRS port belongs is determined according to the first indication information transmitted from the network device, which may improve the flexibility of configuring the TCI state corresponding to the downlink data transmission.

The DMRS port set to which the DMRS port belongs is determined above, and the following describes how to determine the TCI state corresponding to the DMRS port by the terminal device.

Before the terminal device determines the TCI state corresponding to the DMRS port, the network device transmits second indication information to the terminal device, and the terminal device determines the transmission number of the downlink data in the time domain based on the second indication information. Optionally, the second indication information is a physical downlink shared channel aggregation factor (PDSCH-AggregationFactor).

Figure 8:
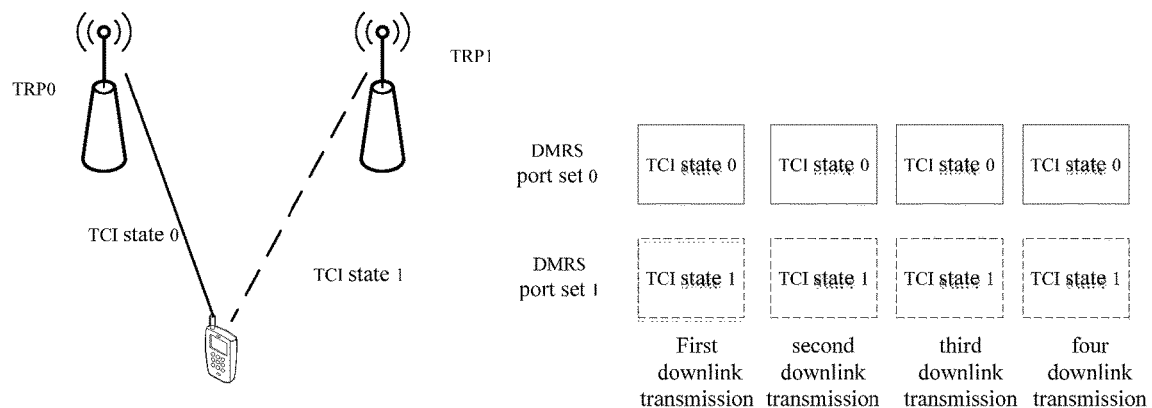
FIG. 8 is a first schematic diagram illustrating a TCI state provided by an embodiment of the present disclosure.

In some embodiments, the DMRS ports corresponding to different DMRS port sets correspond to different TCI states, and each time downlink data is transmitted in the time domain, the TCI state corresponding to each DMRS port is constant. For example, the terminal device determines that the DMRS ports corresponding to DMRS port set 0 correspond to TCI state 0, and the DMRS ports corresponding to DMRS port set 1 correspond to TCI state 1. In the M transmissions in the time domain, the terminal device performs downlink data reception according to the correspondence. A first diagram of the TCI state is shown in FIG. 8, in which TCI state 0 corresponds to TRP0 and DMRS port set 0. TCI state 1 corresponds to TRP1 and DMRS port set 1; in M (M=4) data transmissions, the terminal device always performs the downlink data reception according to a correspondence between the TCI state 0 and the DMRS ports corresponding to the DMRS port set 0, as well as a correspondence between the TCI state 1 and the DMRS ports corresponding to the DMRS port set 1. Thus, a processing flow for the terminal device to receive the downlink data is simpler.

Figure 9:
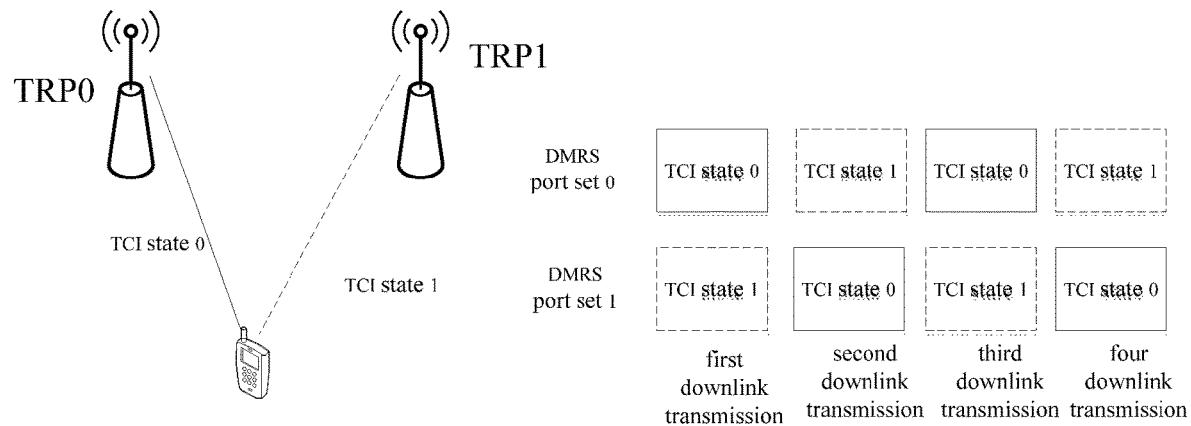
FIG. 9 is a second schematic diagram of a TCI state provided by an embodiment of the present disclosure.

In other embodiments, based on the corresponding TCI state in the previous downlink data transmission, the terminal device determines the TCI state corresponding to each DMRS port in the downlink data transmission according to a second preset strategy. The second preset strategy includes at least one of the following: an offset of the TCI state, a cycle of the TCI state, and a swapping of the TCI state. For example, the terminal device determines the TCI states corresponding to the DMRS ports belonging to different DMRS port sets during a first downlink data transmission (e.g., the DMRS ports corresponding to DMRS port set 0 correspond to TCI state 0, the DMRS ports corresponding to DMRS port set 1 correspond to TCI state 1); in M transmissions in the time domain, based on the correspondence in the previous transmission, the terminal device changes the correspondence between the DMRS ports and the TCI states according to the second preset strategy, and performs corresponding data reception according to the correspondence in this transmission. In this way, when different transmissions are performed through one DMRS port set, the transmissions are from different TRPs, and the corresponding downlink data is also transmitted from different TRPs in different transmissions, which may obtain a better diversity effect. A second schematic diagram of the TCI state is shown in FIG. 9. As shown in FIG. 9, in the first downlink data transmission and the third downlink data transmission. TCI state 0 corresponds to TRP0 and DMRS port set 0, and TCI state 1 corresponds to TRP1 and DMRS port set 1; in the second downlink data transmission and the fourth downlink data transmission, TCI state 1 corresponds to TRP0 and DMRS port set 0, and TCI state 0 corresponds to TRP1 and DMRS port set 1.

Figure 10:
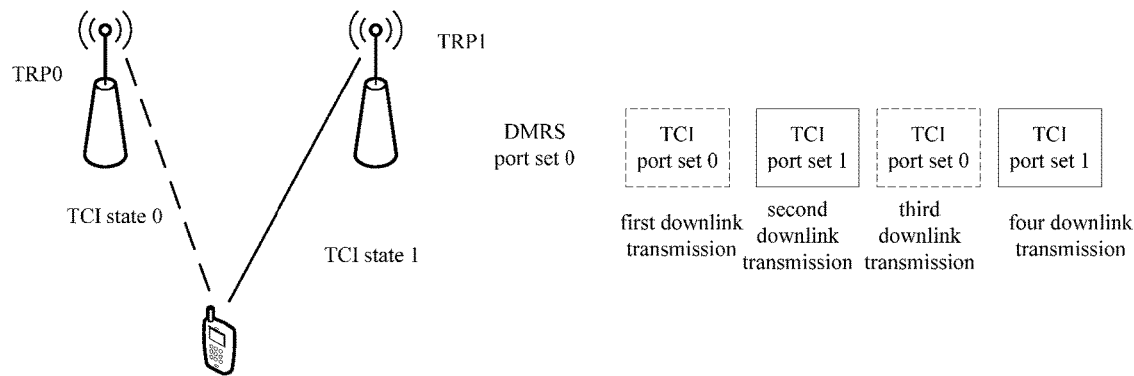
FIG. 10 is a schematic diagram illustrating a corresponding TCI state when each downlink data transmission is determined according to a third preset strategy by a terminal device of an embodiment of the present disclosure.

In still other embodiments, when the number of DMRS port sets is 1, the TCI state corresponding to the DMRS port in each downlink data transmission in the time domain is determined according to a third preset strategy. The third preset strategy includes at least one of the following: TCI states in a TCI sequence formed by the K TCI states are sequentially used in respective downlink data transmissions, and after all of the K TCI states are used, the K TCI states are used again in the order they are previously used in the downlink data transmission; and some TCI states are selected from the K TCI states (the number of these TCI states is the same as the transmission number of the downlink data in the time domain), and these TCI states each are respectively used in downlink data transmissions in sequence. In this way, since the terminal device does not need to receive the downlink data transmitted from multiple TRPs at the same time, the processing flow for the terminal device to receive the downlink data is simpler. In a specific implementation, if M is greater than or equal to K, the third preset strategy is as follows: TCI states in a TCI sequence formed by the K TCI states are sequentially used in respective downlink data transmissions, and after all of the K TCI states are used, the K TCI states are used again in the order they are previously used in the downlink data transmission. For example, the K TCI states are used sequentially, and when the K TCI states are all used, they are used again in sequence from the first TCI state. If M is less than K, the third preset strategy is as follows: some TCI states are selected from the K TCI states (the number of these TCI states is the same as the transmission number of the downlink data in the time domain), and these TCI states each are respectively used in downlink data transmissions in sequence. For example, first M TCI states are selected from K TCI states for use in sequence. Or in a specific implementation, the terminal device determines the corresponding TCI state for each downlink data transmission according to the third preset strategy. As shown in FIG. 10, the first downlink data transmission and the third downlink data transmission correspond to TCI state 0, and the second downlink data transmission and the fourth downlink data transmission correspond to TCI state 1.

In Step S202, a RV value corresponding to the downlink data transmission is determined based on the DCI.

Optionally, the terminal device determines the RV value corresponding to the downlink data transmission based on the antenna port indication information and/or RV indication information in the DCI. When the embodiments of the present disclosure are implemented, the TCI state corresponding to the DMRS port may be determined first, and then the RV value corresponding to the downlink data transmission is determined. Since the DMRS port set to which the DMRS port belongs has been obtained when previously determining the TCI state corresponding to the DMRS port, the RV value corresponding to the downlink data transmission is only determined based on the RV indication information in the DCI. It is also possible to determine the RV value corresponding to the downlink data transmission first, and then determine the TCI state corresponding to the DMRS port. In this case, the RV value corresponding to the downlink data transmission is determined based on the antenna port indication information and the RV indication information in the DCI.

In some embodiments, the RV value corresponding to each downlink data transmission is determined based on a correspondence between a RV value and the number of downlink data transmissions in the RV indication information in the DCI; in each downlink data transmission in the time domain, all DMRS ports correspond to the same RV value. In this way, it is possible to reduce the processing flow of the terminal device for downlink data transmission. For example, T DMRS port sets corresponding to one downlink data transmission in the time domain correspond to the same RV value, and there is no intersection between the T DMRS port sets. Based on the redundancy version indication information in the DCI, the terminal device selects one of the Z correspondences to determine the RV value used in the nth transmission. Optionally, the Z correspondences may be Z correspondences between the RV value and M transmissions specified in the protocol. As shown in Table 1, according to a NR protocol, each row in Table 1 represents a correspondence between a RV value and M downlink data transmissions. The redundancy version indication information in the DCI may be used to determine which row of correspondence is used to determine the RV value in the nth transmission. X0, X1, X2, X3 and a value 0, 1, 2, and 3 of the redundancy version indication information in the DCI may be arbitrarily combined. A typical combination is X0=0, X1=1, X2=2, X3=3.

| Value of the redundancy version indication information in DCI ($rv_{id}$) | Value of the redundancy version $rv_{id}$ corresponding to nth transmission | | | |
|---|---|---|---|---|
| | n mod 4 = 0 | n mod 4 = 1 | n mod 4 = 2 | n mod 4 = 3 |
| X0 | 0 | 2 | 3 | 1 |
| X2 | 2 | 3 | 1 | 0 |
| X3 | 3 | 1 | 0 | 2 |
| X1 | 1 | 0 | 2 | 3 |

Figure 11:
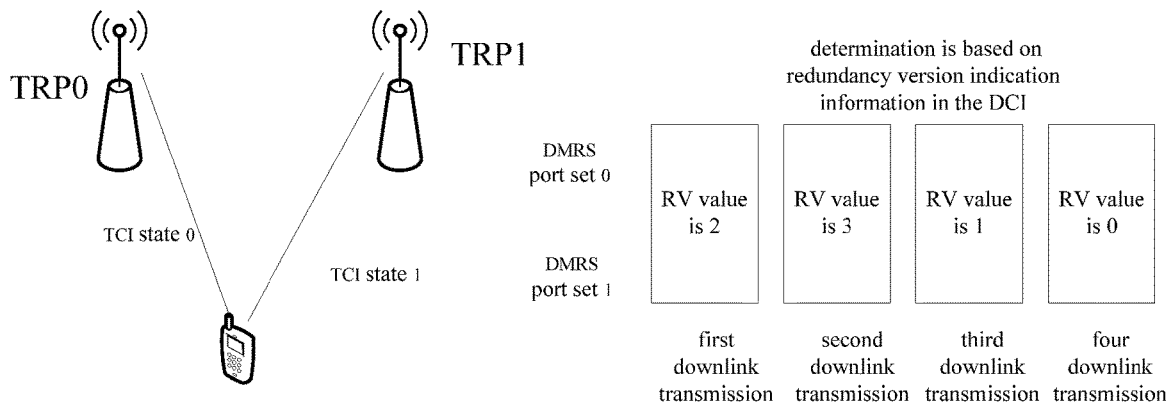
FIG. 11 is a first schematic diagram illustrating a relationship between DMRS port sets and RV values provided by an embodiment of the present disclosure.

As an example, a first schematic diagram of a relationship between DMRS port sets and RV values provided by an embodiment of the present disclosure is shown in FIG. 11. Based on the redundancy version indication information in the DCI, the terminal device determines that the RV value used in the first downlink data transmission is 2, the RV value used in the second downlink data transmission is 3, the RV value used in the third downlink data transmission is 1, and the RV value used in the fourth downlink data transmission is 0. When the redundancy version indication information in the DCI is different, the above-mentioned correspondence is also different.

In other embodiments, the terminal device selects the RV value corresponding to each DMRS port set to which the DMRS port belongs based on the RV indication information in the DCI, and in each downlink data transmission in the time domain, the RV value corresponding to the DMRS port set to which the DMRS port belongs is constant. In this way, the processing flow for the terminal device to receive the downlink data transmission may be simplified. For example, in one downlink data transmission in the time domain, T DMRS port sets correspond to different RV values, and in different downlink data transmissions in the time domain, the correspondence between the T DMRS port sets and the RV values remains unchanged. That is, if the RV value corresponding to DMRS port set 1 is 1 in the first downlink data transmission, then the RV value corresponding to DMRS port set 1 is 1 in each downlink data transmission. In a specific implementation, based on the redundancy version indication information in the DCI indication, the terminal device selects one of the Z correspondences to determine the RV value corresponding to the t-th DMRS port. As shown in Table 2, taking T=2 and Z=4 as an example, each row in Table 2-1, Table 2-2, and Table 2-3 represents a correspondence between the RV values and T DMRS port sets. It may be determined through the redundancy version indication information in the DCI to use which row of correspondence to determine the RV value corresponding to the t-th DMRS port. X0, X1, X2, X3 and a value 0, 1, 2, and 3 of the redundancy version indication information in the DCI may be arbitrarily combined. A typical combination is X0=0, X1=1, X2 X3=3.

TABLE 2-1

| Value of the redundancy version indication information $rv_{id}$ in DCI | Value of the redundancy version $rv_{id}$ corresponding to t-th DMRS port set | |
| --- | --- | --- |
| | t mod T = 0 | t mod T = 1 |
| X0 | 0 | 2 |
| X2 | 2 | 3 |
| X3 | 3 | 1 |
| X1 | 1 | 0 |

TABLE 2-2

| Value of the redundancy version indication information $rv_{id}$ in DCI | Value of the redundancy version $rv_{id}$ corresponding to t-th DMRS port set | |
| --- | --- | --- |
| | (t + 1) mod T = 0 | (t + 1) mod T = 1 |
| X0 | 0 | 2 |
| X2 | 2 | 3 |
| X3 | 3 | 1 |
| X1 | 1 | 0 |

TABLE 2-3

| Value of the redundancy version indication information $rv_{id}$ in DCI | Value of the redundancy version $rv_{id}$ corresponding to t-th DMRS port set | |
| --- | --- | --- |
| | (t − 1) mod T = 0 | (t − 1) mod T = 1 |
| X0 | 0 | 2 |
| X2 | 2 | 3 |
| X3 | 3 | 1 |
| X1 | 1 | 0 |

Figure 12:
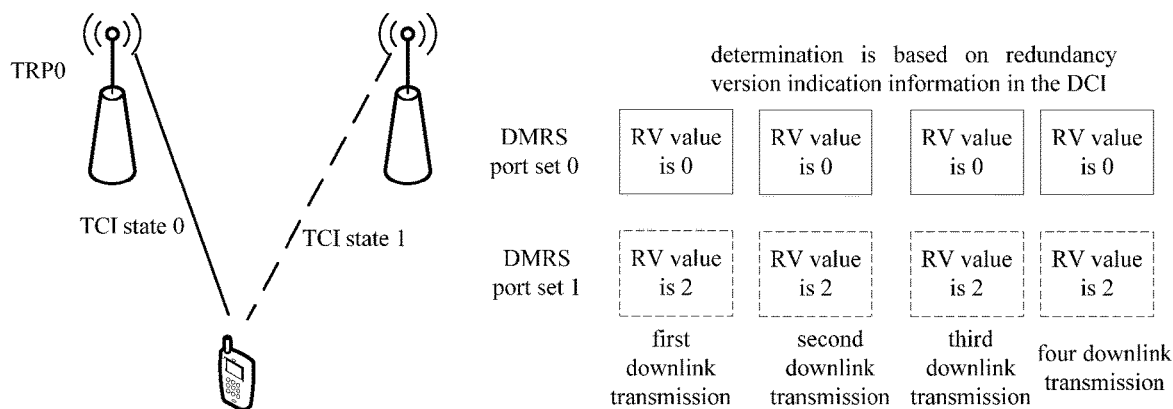
FIG. 12 is a second schematic diagram illustrating a relationship between DMRS port sets and RV values provided by an embodiment of the present disclosure.

As an example, a second schematic diagram of a relationship between DMRS port sets and RV values provided by an embodiment of the present disclosure is shown in FIG. 12. If, in the first downlink data transmission, the RV value corresponding to the DMRS port set 0 is 0 and the RV value corresponding to DMRS port set 1 is 2, then in the second, third, and fourth downlink data transmissions, the RV value corresponding to DMRS port set 0 is 0, and the RV value corresponding to DMRS port set 1 is 2.

In still other embodiments, the terminal device is configured to select, based on the RV indication information in the DCI, the RV value corresponding to each DMRS port set, to which the DMRS ports belong, in one downlink data transmission in the time domain, where the DMRS port is indicated by the antenna port indication information in the DCI; determine, based on the RV value corresponding to each DMRS port set in the one downlink data transmission, one or more downlink data transmissions subsequent to this one downlink data transmission according to the fourth preset strategy. The fourth preset strategy includes at least one of the following: a value offset of the RV value, a position shift in the RV value sequence, and a RV value exchange. In this way, better downlink data transmission performance may be obtained, different RV values are used for different downlink data transmissions, which may fully utilize coding gain. For example, in one downlink data transmission in the time domain, T DMRS port sets correspond to different RV values; in different downlink data transmissions in the time domain, the RV value corresponding to the DMRS port set is determined based on the RV value corresponding to the previous downlink data transmission according to the fourth preset strategy. In a specific implementation, the terminal device selects one of the Z correspondences according to the redundancy version indication information in the DCI, to determine the RV value corresponding to the t-th DMRS port during the first downlink data transmission. The Z correspondences may be correspondences between the RV values and T DMRS port sets specified in the protocol.

Figure 13:
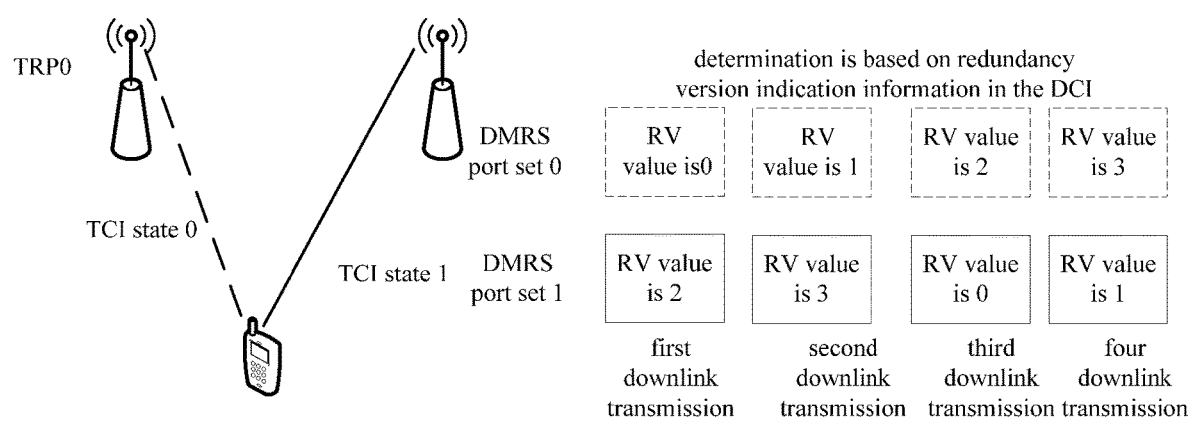
FIG. 13 is a third schematic diagram illustrating a relationship between DMRS port sets and RV values provided by an embodiment of the present disclosure.
Figure 14:
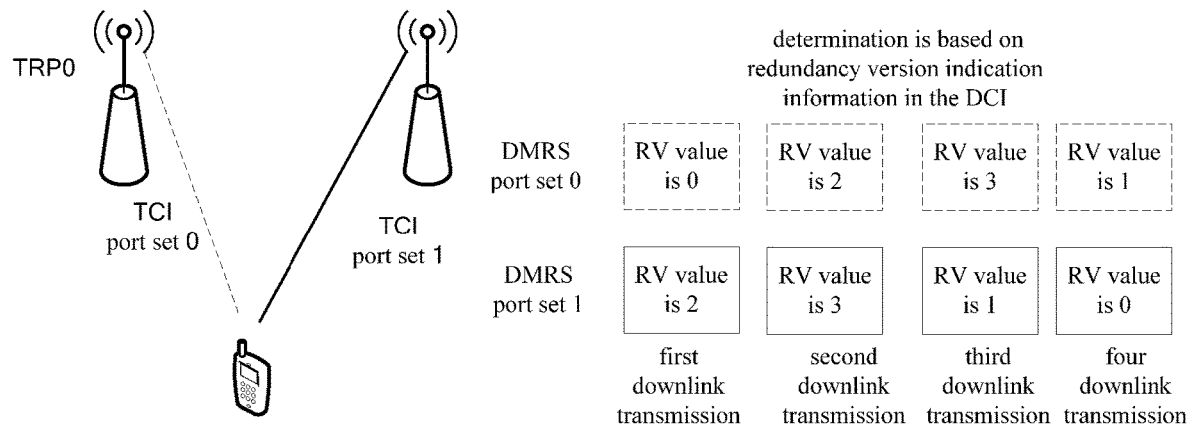
FIG. 14 is a fourth schematic diagram illustrating a relationship between DMRS port sets and RV values provided by an embodiment of the present disclosure.

A third schematic diagram of a relationship between DMRS port sets and RV values provided by an embodiment of the present disclosure is shown in FIG. 13. Taking the fourth strategy as the value offset of the RV value as an example, the terminal device determines the RV value corresponding to the t-th DMRS port set in the nth downlink data transmission $rv_{n,t}=rv_{(n-1),t}+\Delta_t$, where $rv_{(n-1),t}$ is the RV value corresponding to the t-th DMRS port set in the (n−1)th transmission. $\Delta_t$ is a positive integer and indicates the value offset of the RV value. The above algorithm also includes a modulo operation, for example, $rv_{n,t}=(rv_{(n-1),t}+\Delta_t) \mod 4$. A fourth schematic diagram of a relationship between DMRS port sets and RV values provided by an embodiment of the present disclosure is shown in FIG. 14. Taking the fourth strategy as the position shift in the RV value sequence as an example, the terminal device determines the RV value $rv_{1,t}$ corresponding to the t-th DMRS port set in the first downlink data transmission, and selects first $\Delta, 2\Delta \ldots$ values after $rv_{0,t}$ according to a preset list (for example, 0, 2, 3, 1) as the RV value corresponding to the t-th DMRS port set in the second, ... M th transmission. When the list (0, 2, 3, 1) reaches the end, it recycles from the beginning.

In some other embodiments, the terminal device determines, based on the RV indication information in the DCI, the RV value corresponding to each DMRS port set to which the DMRS port belongs in each downlink data transmission. In a specific implementation, the terminal device determines the RV value corresponding to each DMRS port set in each downlink data transmission based on a correspondence between the order of the downlink data transmission and the DMRS port set as well as the RV value. For example, based on a RV value sequence in a specific order, DMRS port sets in one transmission corresponds to RV values in adjacent positions in the RV value sequence, and the adjoining includes a cyclic position adjoining. For example, the RV value sequence is RV1, RV2, RV3 . . . RVn. In the first downlink data transmission, the RV value corresponding to DMRS port set 0 is RV1, and the RV value corresponding to DMRS port set 1 is RV2; in the second downlink data transmission, the RV value corresponding to DMRS port set 0 is RV3, and the RV value corresponding to DMRS port set 1 is RV4; and so on. When n is an even number, in the (n/2+1)th downlink data transmission, the RV value corresponding to DMRS port set 0 is RV1, and the RV value corresponding to DMRS port set 1 is RV2; when n is an odd number, in the ((n−1)/2+1)th downlink data transmission, the RV value corresponding to DMRS port set 0 is RVn, and the RV value corresponding to DMRS port set 1 is RV1. In this way, the diversity gain on the multiple TRPs may be obtained limitedly, and the processing performance of the downlink data transmission may be improved in combination with the performance of different RVs. For example, the terminal device determines the RV corresponding to each DMRS port set during each time domain transmission in a sequence of T DMRS port sets corresponding to the first downlink data transmission, T DMRS port sets corresponding to the second downlink data transmission, . . . , and T DMRS port sets corresponding to the Mth transmission. In a specific implementation, the terminal device selects one of the Z correspondences according to the redundancy version indication information in the DCI to determine the RV value corresponding to the t-th (t=0, 1, . . . , T−1) DMRS port in the n-th (n=1, . . . , M) transmission in the time domain. The Z correspondences may be correspondences between the RV values and the T DMRS port sets as well as M transmissions specified by the protocol. As shown in Table 3, taking T=2 and Z=4 as an example, each row in Table 3 represents a correspondence between the RV values and T DMRS port sets. It may be determined, through the redundancy version indication information in the DCI, which row of correspondence is used to determine the RV value corresponding to the t-th DMRS port. X0, X1, X2, X3 and a value 0, 1, 2, and 3 of the redundancy version indication information in the DCI may be arbitrarily combined. A typical combination is X0=0, X1=1. X2=2. X3=3. Value options of "a" are 0, +1, −1; value options of "b" are 0, +1, −1.

TABLE 3

| Value of the redundancy version indication information $rv_{id}$ in DCI | Value of the redundancy version corresponding to t-th DMRS port set $rv_{id}$ during nth transmission | | | |
| --- | --- | --- | --- | --- |
| | $((t + a) + (n + b)*T)$ mod 4 = 0 | $((t + a) + (n + b)*T)$ mod 4 = 1 | $((t + a) + (n + b)*T)$ mod 4 = 2 | $((t + a) + (n + b)*T)$ mod 4 = 3 |
| X0 | 0 | 2 | 3 | 1 |
| X2 | 2 | 3 | 1 | 0 |
| X3 | 3 | 1 | 0 | 2 |
| X1 | 1 | 0 | 2 | 3 |

Figure 15:
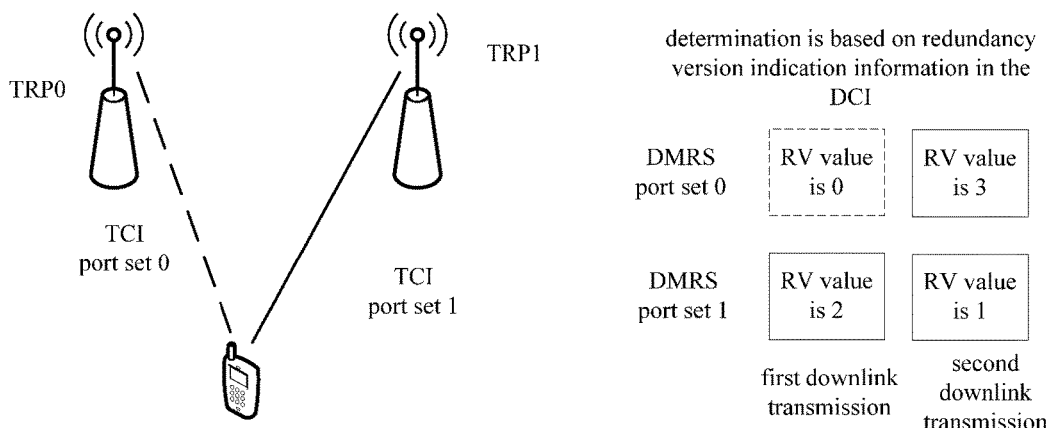
FIG. 15 is a fifth schematic diagram illustrating a relationship between DMRS port sets and RV values provided by an embodiment of the present disclosure.

A fifth schematic diagram of a relationship between DMRS port sets and RV values provided by an embodiment of the present disclosure is shown in FIG. 15. When the redundancy version indication information in the DCI indicates a correspondence in the first row in Table 5, and M=2, a=0, b=−1, the RV values corresponding to different DMRS port sets in each downlink data transmission are as follows respectively; in the first downlink data transmission, the RV value corresponding to DMRS port set 1 is 2, and the RV value corresponding to DMRS port set 0 is 0; in the second downlink data transmission, the RV value corresponding to DMRS port set 1 is 1, and the RV value corresponding to DMRS port set 0 is 3.

In still other embodiments, the terminal device determines the RV value corresponding to each DMRS port set in each downlink data transmission based on the correspondence between each DMRS port set and the RV value in M downlink data transmissions. In a specific implementation, the terminal device determines the RV corresponding to each DMRS port set during each time domain transmission according to a sequence of M downlink data transmissions corresponding to the first DMRS port set. M downlink data transmissions corresponding to the second DMRS port set, . . . , and M time domains corresponding to the T-th DMRS port set. For example, based on a RV value sequence in a specific order, multiple transmissions for the same DMRS port set correspond to RV values in adjacent positions in the RV value sequence, and the adjoining includes a cyclic position adjoining. For example, the RV value sequence is RV1, RV2, RV3 . . . RVn. and for DMRS port set 0, in the first downlink data transmission, the RV value corresponding to DMRS port set 0 is RV1; in the second downlink data transmission, the RV value corresponding to DMRS port set 0 is RV2, and so on, in the n-th downlink data transmission, the RV value corresponding to DMRS port set 0 is RVn; in the (n+1)th downlink data transmission, the RV value corresponding to DMRS port set 0 is RV1. In this way, the limited time repetition may be combined with the performance of different RVs, and the processing performance of the downlink data transmission may be improved. For example, the terminal device selects one of the Z correspondences according to the redundancy version indication information in the DCI to determine the RV value corresponding to the t-th DMRS port in the n-th transmission in the time domain. The Z correspondences may be correspondences between the RV values and the T DMRS port sets as well as M transmissions specified by the protocol. As shown in Table 4, taking T=2 and Z=4 as an example, each row in Table 4 represents a correspondence between the RV values and T DMRS port sets. It may be determined, through the redundancy version indication information in the DCI, to use which row of correspondence to determine the RV value corresponding to the t-th DMRS port. X0, X1, X2, X3 and a value 0, 1, 2, and 3 of the redundancy version indication information in the DCI may be arbitrarily combined. A typical combination is X0=0, X1=1. X2=2, X3=3. Value options of "b" may be 0, +1, −1.

TABLE 4

| Value of the redundancy version indication information $rv_{id}$ in DCI | Value of the redundancy version corresponding to t-th DMRS port set $rv_{id}$ during nth transmission | | | |
|---|---|---|---|---|
| | $(n + M*(t + b))$ mod $4 = 0$ | $(n + M*(t + b))$ mod $4 = 1$ | $(n + M*(t + b))$ mod $4 = 2$ | $(n + M*(t + b))$ mod $4 = 3$ |
| X0 | 0 | 2 | 3 | 1 |
| X2 | 2 | 3 | 1 | 0 |
| X3 | 3 | 1 | 0 | 2 |
| X1 | 1 | 0 | 2 | 3 |

Figure 16:
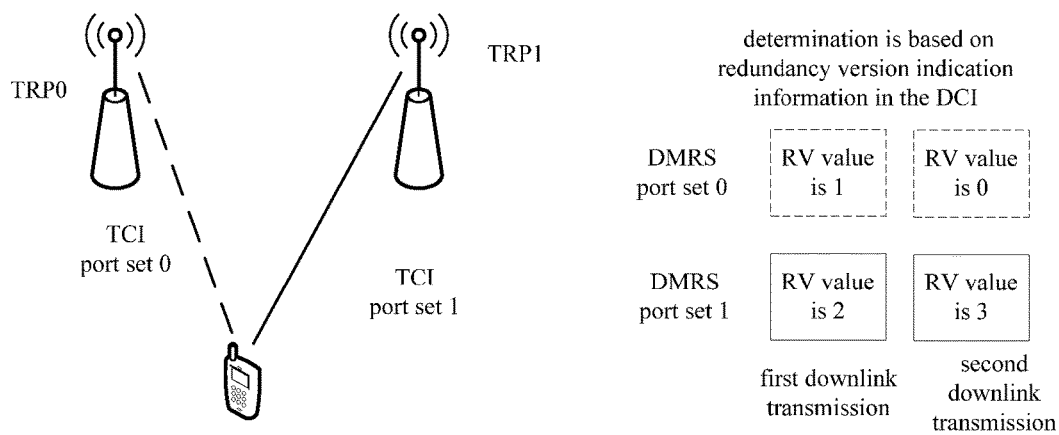
FIG. 16 is a sixth schematic diagram illustrating a relationship between DMRS port sets and RV values provided by an embodiment of the present disclosure.

A sixth schematic diagram of a relationship between DMRS port sets and RV values provided by an embodiment of the present disclosure is shown in FIG. 16. When the redundancy version indication information in the DCI indicates a correspondence in a third row of Table 4, M=2 and b=0, the RV values corresponding to different DMRS port sets for each downlink data transmission are as follows respectively; in the first downlink data transmission, the RV value corresponding to DMRS port set 0 is 1, and the RV value corresponding to DMRS port set 1 is 2; in the second downlink data transmission, the RV value corresponding to DMRS port set 0 is 0, and the RV value corresponding to DMRS port set 1 is 3.

In other embodiments, the terminal device is configured to determine, based on the RV indication information in the DCI, the RV value corresponding to the first DMRS port set, to which the DMRS port belongs, in one downlink data transmission; determine, based on the RV value corresponding to the first DMRS port set, the RV values corresponding to DMRS port sets, to which the DMRS ports belong, other than the first DMRS port set in this one downlink data transmission according to the fifth preset strategy. The fifth preset strategy includes at least one of the following: the RV values corresponding to other DMRS port sets are multiple values obtained by accumulating the RV values corresponding to the first DMRS port set in a third value sequence and then taking the modulo; and a correspondence between the RV values and the DMRS port set sequence. In a specific implementation, the fifth preset strategy is that the RV values corresponding to other DMRS port sets are multiple values obtained by accumulating the RV values corresponding to the first DMRS port set in a third value sequence and then taking the modulo, the terminal device selects one of the Z correspondences according to the redundancy version indication information in the DCI to determine the RV value rv_n used in the nth transmission. The Z correspondences may be correspondences between the RV values and M downlink data transmissions specified by the protocol. Then, the terminal device determines the RV values corresponding to different DMRS port sets in the nth downlink data transmission according to the RV value rv_n used in the nth downlink data transmission. Specifically, the terminal device makes the RV value rv_n used in the nth downlink data transmission correspond to DMRS port set 0, and then selects the Δth value after rv_n according to a prescribed list (for example, 0, 2, 3, 1) to be used for DMRS port set 1, . . . , DMRS port set T in sequence. When the list (0, 2, 3, 1) reaches the end, it recycles from the beginning. As shown in Table 5, each row in Table 5 identifies a correspondence between the RV values and M downlink data transmissions. It may be determined, through the redundancy version indication information in the DCI, to use which row of correspondence to determine the RV value used in the nth transmission. X0, X1, X2, X3 and a value 0, 1, 2, and 3 of the redundancy version indication information in the DCI may be arbitrarily combined. A typical combination is X0=0, X1=1, X2=2. X3=3.

TABLE 5

| Value of the redundancy version indication information $rv_{id}$ in DCI | Value of the redundancy version $rv_{id}$ during nth transmission | | | |
|---|---|---|---|---|
| | n mod 4 = 0 | n mod 4 = 1 | n mod 4 = 2 | n mod 4 = 3 |
| X0 | 0 | 2 | 3 | 1 |
| X2 | 2 | 3 | 1 | 0 |
| X3 | 3 | 1 | 0 | 2 |
| X1 | 1 | 0 | 2 | 3 |

Figure 17:
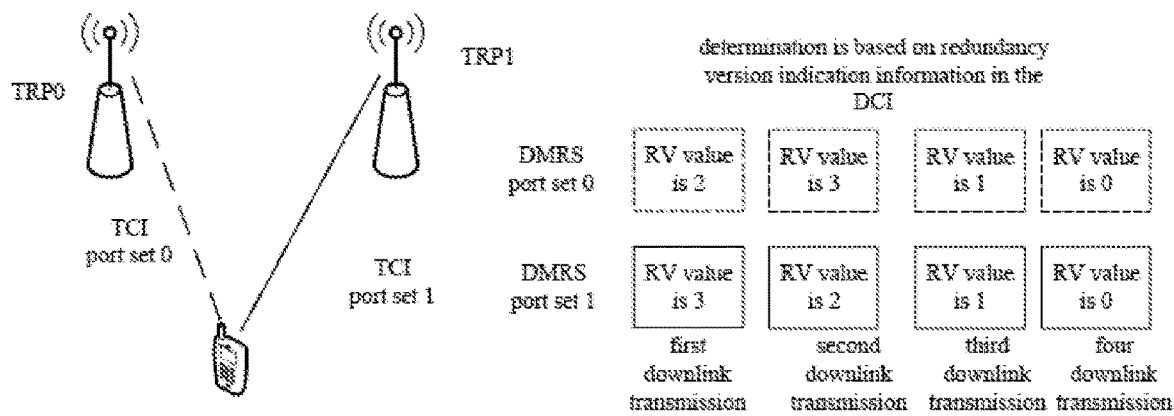
FIG. 17 is a seventh schematic diagram illustrating a relationship between DMRS port sets and RV values provided by an embodiment of the present disclosure.

A seventh schematic diagram of a relationship between DMRS port sets and RV values provided by an embodiment of the present disclosure is shown in FIG. 17. Δ equals to 1, that is, a first value after the RV value is used for the next DMRS port set; the terminal device determines that in the first downlink data transmission, the RV value corresponding to DMRS port set 0 is 2, the RV value corresponding to DMRS port set 1 is 3; in the second downlink data transmission, the RV value corresponding to DMRS port set 0 is 3, and the RV value corresponding to DMRS port set 1 is 2; in the third downlink data transmission, the RV value corresponding to DMRS port set 0 is 1, the RV value corresponding to DMRS port set 1 is 1; in the fourth downlink data transmission, the RV value corresponding to DMRS port set 0 is 0, the RV value corresponding to DMRS port set 1 is 0.

In another optional embodiment, the terminal device obtains, based on the RV indication information in the DCI, multiple pieces of RV information according to a sixth preset strategy, and the terminal device selects one of the above-mentioned Z correspondences according to each RV information to determine the RV value corresponding to a DMRS port set to which the DMRS port belongs in the downlink data transmission, the DMRS port is indicated by the antenna port indication information in the DCI, and the Z correspondences may be correspondences between the RV values and M downlink data transmissions specified by the protocol. The sixth preset strategy includes: the values of the multiple pieces of RV indication information are multiple values obtained by accumulating the values of the RV indication information in the DCI in the order of the fourth value and then taking the modulus. In a specific implementation, the terminal device determines the RV information corresponding to each DMRS port set according to the sixth preset strategy according to the redundancy version indication information indicated in the DCI, and determines the RV value corresponding to each DMRS port set in each downlink data transmission. In this way, since the RV value determination rule is simple, it is convenient for the terminal device to perform downlink data transmission processing. In a specific implementation, first, the terminal device takes the value of $I_0$ according to the redundancy version indication information in the DCI indication, and obtains more version indication information $I_1, \ldots, I_{T-1}$, according to the sixth preset strategy, where $I_t=\Delta*t+I0$ ($\Delta$ is a positive integer); finally, the $I_t$ value is modulo processing. Here, $\Delta$ may be understood as an increase value at equal intervals. Then, the terminal device selects one of the above-mentioned Z correspondences according to $I_t$ to determine the RV value corresponding to the t-th (t=0, 1, . . . , T−1) DMRS port during the nth (n=1, . . . , M) transmission in the time domain. The Z correspondences may be correspondences between the RV values and M downlink data transmissions specified by the protocol.

As shown in Table 6, each row in Table 6 represents the correspondence between RV values and M downlink data transmissions. It may be determined to use which correspondence in the row to determine the RV value used in the nth transmission through the redundancy version indication information in the DCI. X0, X1, X2, X3 and a value 0, 1, 2, and 3 of the redundancy version indication information in the DCI may be arbitrarily combined. A typical combination is X0=0, X1=1, X2=2, X3=3.

Figure 18:
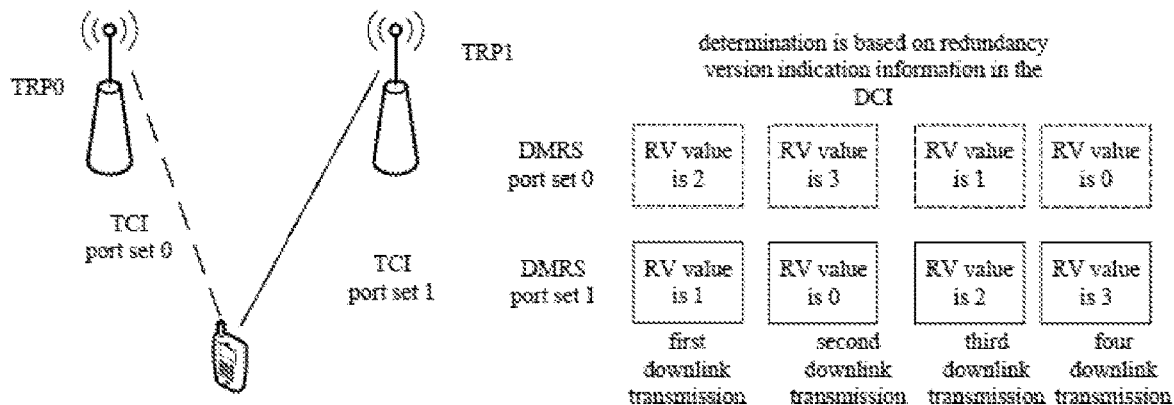
FIG. 18 is an eighth schematic diagram illustrating a relationship between DMRS port sets and RV values provided by an embodiment of the present disclosure.

An eighth schematic diagram of a relationship between DMRS port sets and RV values provided by an embodiment of the present disclosure is shown in FIG. 18. $\Delta$=2, that is, the terminal device determines that in the first downlink data transmission, the RV value corresponding to DMRS port set 0 is 2, the RV value corresponding to DMRS port set 1 is 1; in the second downlink data transmission, the RV value corresponding to DMRS port set 0 is 3, and the RV value corresponding to DMRS port set 1 is 0; in the third downlink data transmission, the RV value corresponding to DMRS port set 0 is 1, the RV value corresponding to DMRS port set 1 is 2; in the fourth downlink data transmission, the RV value corresponding to DMRS port set 0 is 1, the RV value corresponding to DMRS port set 1 is 2; and in a fourth downlink data transmission, the RV value corresponding to DMRS port set 0 is 0, the RV value corresponding to DMRS port set 1 is 3.

In some embodiments, the method further includes step S203.

In step S203, the terminal device receives downlink data based on the TCI state and the RV value.

It should be noted that an execution order of the above steps S201 and S202 is not specifically limited, that is, S202 may be executed before S201, or the two steps may be executed in parallel.

It should be noted that, in the embodiments of the present disclosure, the downlink data transmission is any one of the following three types, or a combination of any two:

1. The downlink data transmission corresponds to PDSCHs in multiple slots, or multiple consecutive PDSCH transmission opportunities.

2. The downlink data transmission corresponds to multiple transmissions occupying different symbols in one slot.

3. The downlink data transmission is multiple downlink data transmissions transmitted at the same time, and different downlink data transmissions correspond to different TCI states.

When there are multiple downlink data transmissions, the multiple downlink data transmissions are exactly the same channel-coded bit data; or, when there are multiple downlink data transmissions, the multiple downlink data transmissions are the same data or different bits of data taken out of the same transport block (TB) after channel coding.

When there are multiple downlink data transmissions, the multiple downlink data transmissions correspond to the same hybrid automatic repeat request (HARQ) process.

Figure 19:
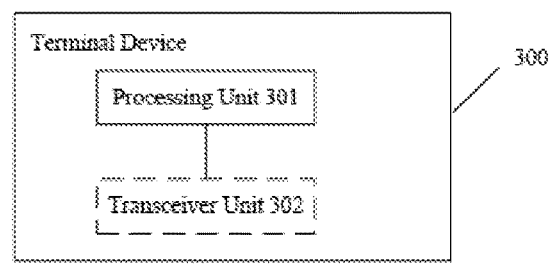
FIG. 19 is a schematic diagram of a composition structure of a terminal device provided by an embodiment of the present disclosure.

In order to implement the aforementioned downlink data transmission method, an embodiment of the present disclosure further provides a terminal device. A composition structure of the terminal device is shown in FIG. 19, and the terminal device 300 includes a processing unit 301.

The processing unit 301 is configured to determine a TCI state corresponding to downlink data transmission based on DCI; determine a redundancy version (RV) value corresponding to the downlink data transmission based on the DCI; the TCI state and the RV value are used for receiving downlink data by the terminal device 300.

In the embodiments of the present disclosure, the processing unit 301 is configured to determine the TCI state corresponding to the downlink data transmission based on antenna port indication information and TCI state indication information in the DCI.

In the embodiments of the present disclosure, the processing unit 301 is configured to determine K TCI states based on the TCI state indication information in the DCI, where K is greater than 1; and determine a TCI state corresponding to each DMRS port in each downlink data transmission in a time domain from the K TCI states according to a DMRS port set to which a DMRS port belongs, and the DMRS port is indicated by the antenna port indication information in the DCI. The DMRS port set to which the DMRS port belongs is determined based on a DMRS CDM group corresponding to a DMRS port indicated by port indication information in the DCI, and a correspondence between the DMRS CDM group and the DMRS port set. The correspondence between the DMRS CDM groups and the DMRS port sets is preset by the terminal device, or is sent to the terminal device by a network device through a configuration signaling.

In the embodiments of the present disclosure, the processing unit 301 is configured to determine the DMRS port set to which the DMRS port belongs based on first indication information transmitted from the network device.

In the embodiments of the present disclosure, the processing unit 301 is configured to determine all DMRS ports belong to one DMRS port set when a value corresponding to the first indication information is a first value.

In the embodiments of the present disclosure, the processing unit 301 is configured to determine, based on a preset correspondence between a DMRS port and a DMRS port set, the DMRS port set to which the DMRS port indicated by the port indication information in the DCI belongs, when a value corresponding to the first indication information is a second value.

In the embodiments of the present disclosure, the first indication information indicates DMRS ports included in each DMRS port set.

In the embodiments of the present disclosure, the processing unit 301 is configured such that the terminal device determines the DMRS port set to which the DMRS port belongs based on a DMRS CDM group corresponding to a DMRS port indicated by port indication information in the DCI, and a correspondence between the DMRS CDM group and the DMRS port set, when the first indication information is configured. The correspondence between the DMRS CDM groups and the DMRS port sets is preset by the terminal device, or is sent to the terminal device by a network device through a configuration signaling.

In the embodiments of the present disclosure, the processing unit 301 is configured to determine the DMRS port set to which the DMRS port belongs based on a first preset strategy, when the first indication information is configured.

In the embodiments of the present disclosure, the processing unit 301 is configured to determine the DMRS port set to which the DMRS port belongs based on a first preset strategy.

In the embodiments of the present disclosure, the processing unit 301 is further configured to determine a transmission number of the downlink data in the time domain based on second indication information transmitted from the network device. The second indication information is PDSCH-AggregationFactor.

In the embodiments of the present disclosure, the processing unit 301 is configured to determine that DMRS ports to which different DMRS port sets belong correspond to different TCI states; a TCI state corresponding to each DMRS port is constant each time the downlink data is transmitted in the time domain.

In the embodiments of the present disclosure, the processing unit 301 is configured to determine, based on a TCI state corresponding to a previous downlink data transmission, a TCI state corresponding to each DMRS port in the downlink data transmission according to a second preset strategy. The second preset strategy includes at least one of the following: an offset of the TCI state, a cycle of the TCI state and a swapping of the TCI state.

In the embodiments of the present disclosure, the processing unit 301 is configured to determine a TCI state corresponding to the DMRS port in each downlink data transmission in the time domain according to a third preset strategy, when a number of DMRS port sets is 1. The third preset strategy includes at least one of the following: TCI states in a TCI sequence formed by the K TCI states are sequentially used in respective downlink data transmissions, and after all the K TCI states are used, the downlink data transmission repeats a use sequence of the K TCI states; a number of TI states is selected from the K TCI states, where the number of the selected TCI states is same as the transmission number of the downlink data in the time domain, and the selected TCI states are sequentially used in respective downlink data transmissions.

In the embodiments of the present disclosure, the processing unit 301 is configured to determine the RV value corresponding to the downlink data transmission based on the antenna port indication information and/or the RV indication information in the DCI.

In the embodiments of the present disclosure, the processing unit 301 is configured to determine a RV value corresponding to each downlink data transmission based on a correspondence of the RV value and the number of downlink data transmissions in the RV indication information in the DCI; DMRS ports correspond to a same RV value in each downlink data transmission in the time domain, and the DMRS ports are indicated by the antenna port indication information in the DCI.

In the embodiments of the present disclosure, the processing unit 301 is configured to select a RV value corresponding to each DMRS port set to which the DMRS port belongs based on the RV indication information in the DCI; a RV value corresponding to a DMRS port set to which the DMRS port belongs is constant in each downlink data transmission in the time domain, and the DMRS port is indicated by the antenna port indication information in the DCI.

In the embodiments of the present disclosure, the processing unit 301 is configured to select, based on the RV indication information in the DCI, a RV value corresponding to each DMRS port set to which a DMRS port belongs in one downlink data transmission in the time domain, wherein the DMRS port is indicated by the antenna port indication information in the DCI; and determine the RV value corresponding to each DMRS port set to which the DMRS port belongs in one or more downlink data transmissions subsequent to the one downlink data transmission according to a fourth preset strategy based on the RV value corresponding to each DMRS port set in the one downlink data transmission. The fourth preset strategy includes at least one of the following: a value offset of the RV value, a position shift in the RV value sequence and a swapping of the RV value.

In the embodiments of the present disclosure, the processing unit 301 is configured to determine a RV value corresponding to each DMRS port set to which the DMRS port belongs in each downlink data transmission based on the RV indication information in the DCI, and the DMRS port is indicated by the antenna port indication information in the DCI.

In the embodiments of the present disclosure, the processing unit 301 is configured to determine the RV value corresponding to each DMRS port set in each downlink data transmission based on a correspondence between a order of the downlink data transmission and the DMRS port set and the RV value.

In the embodiments of the present disclosure, the processing unit 301 is configured such that based on a RV value sequence in a specific order, multiple downlink data transmissions for a same DMRS port set correspond to RV values in adjacent positions in the RV value sequence, wherein the adjoining include cyclically adjacent positions.

In the embodiments of the present disclosure, the processing unit 301 is configured to determine the RV value corresponding to each DMRS port set in each downlink data transmission based on a correspondence between each DMRS port set and a RV value in M downlink data transmissions, and M is greater than or equal to 1.

In the embodiments of the present disclosure, the processing unit 301 is configured such that based on a RV value sequence in a specific order. DMRS port sets in one transmission correspond to RV values in adjacent positions in the RV value sequence, wherein the adjacent positions include cyclically adjacent positions.

In the embodiments of the present disclosure, the processing unit 301 is configured to determine a RV value corresponding to a first DMRS port set to which the DMRS port belongs in one downlink data transmission based on the RV indication information in the DCI: and based on the RV value corresponding to the first DMRS port set, determine RV values corresponding to other DMRS port sets other than the first DMRS port set to which the DMRS port belongs in the one downlink data transmission according to a fifth preset strategy. The fifth preset strategy includes at least one of the following: the RV values corresponding to other DMRS port sets are multiple values obtained by accumulating the RV values corresponding to the first DMRS port set in a third value sequence and then taking the modulo; and a correspondence between RV values and the DMRS port set sequence.

In the embodiments of the present disclosure, the processing unit 301 is configured to, based on the RV indication information in the DCI, obtain multiple pieces of RV information according to a sixth preset strategy, and each RV information is used for indicating a RV value corresponding to one DMRS port set to which the DMRS port belongs in the downlink data transmission, and the DMRS port is indicated by the antenna port indication information in the DCI. The sixth preset strategy includes: values of the multiple pieces of RV information are multiple values obtained by accumulating a value of the RV indication information in the DCI in a fourth value sequence and then taking the modulus.

In the embodiments of the present disclosure, the downlink data transmission is any one of the following three types, or a combination of any two:

1. The downlink data transmission corresponds to PDSCHs in multiple slots, or multiple consecutive PDSCH transmission opportunities.

2. The downlink data transmission corresponds to multiple transmissions occupying different symbols in one slot.

3. The downlink data transmission is multiple downlink data transmissions transmitted at the same time, and different downlink data transmissions correspond to different TCI states.

When there are multiple downlink data transmissions, the multiple downlink data transmissions are exactly the same channel-coded bit data. Or, when there are multiple downlink data transmissions, the multiple downlink data transmissions are same data or different bit data taken by a same transmission block (TB) through channel coding.

When there are the multiple downlink data transmissions, the multiple downlink data transmissions correspond to a same hybrid automatic repeat request (HARQ) process.

In the embodiments of the present disclosure, the terminal device 300 further includes a transceiver unit 302, configured to receive downlink data based on the TCI state and the RV value.

An embodiment of the disclosure also provides a terminal device, including a processor and a memory for storing a computer program that can nm on the processor, wherein the processor is configured to execute steps of the downlink data transmission method when running the computer program.

Figure 20:
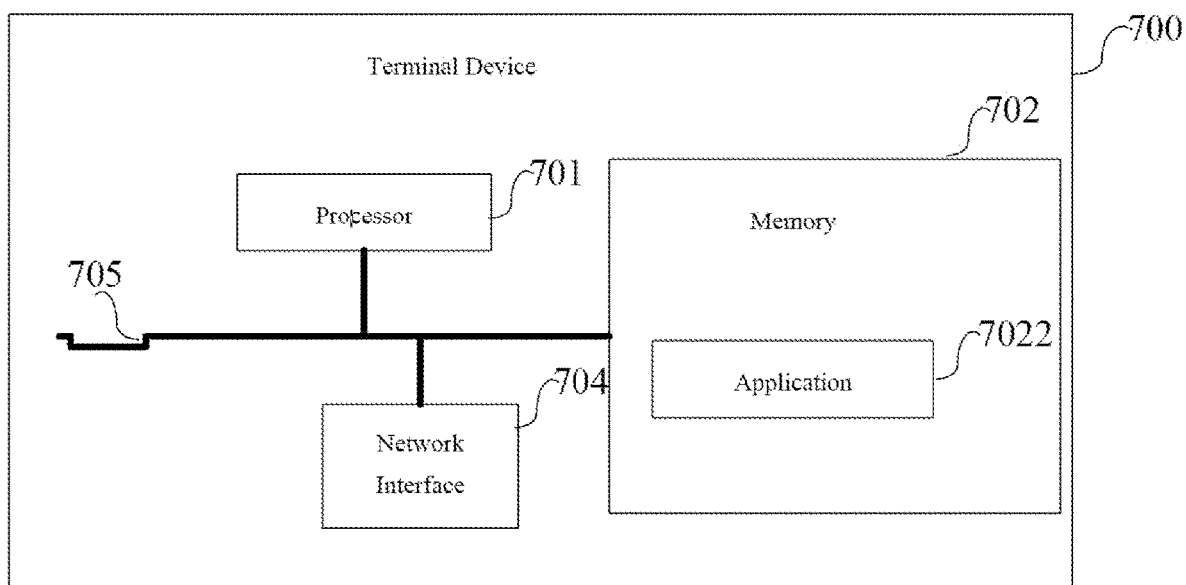
FIG. 20 is a schematic diagram of a hardware composition structure of a terminal device provided by an embodiment of the present disclosure.

FIG. 20 is a schematic diagram of a hardware composition structure of a terminal device of an embodiment of the present disclosure. The terminal device 700 includes at least one processor 701, a memory 702, and at least one network interface 704. Various components in the electronic device 700 are coupled together by a bus system 705. It may be understood that the bus system 705 is configured to implement connection and communication between these components. In addition to a data bus, the bus system 705 also includes a power bus, a control bus, and a state signal bus. However, for clarity of description, various buses are marked as the bus system 705 in FIG. 20.

It should be understood that, the memory 702 may be a volatile memory or a non-volatile memory, or may include both a volatile memory and a non-volatile memory. The non-volatile memory may be a read-only memory (ROM), a programmable ROM (PROM), an erasable PROM (EPROM), an electrically EPROM (EEPROM), a ferromagnetic random access memory (FRAM), a flash memory, a ferromagnetic surface memory, optical disk, or an optical disk, or a compact disc read-only memory (CD-ROM); the ferromagnetic surface memory may be a disk memory or a tape memory. The volatile memory may be a random access memory (RAM), and is used as an external cache. By way of examples but of no limitation, many forms of RAM are available, for example, a static random access memory (SRAM), a synchronous static random access memory (SSRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synclink dynamic random access memory (SLDRAM), and a direct rambus random access memory (DRRAM). The memory 702 described in the embodiments of the present disclosure is intended to include but is not limited to these memories and any other suitable type of memory.

The memory 702 in the embodiments of the present disclosure is configured to store various types of data to support the operations of the terminal device 700. Examples of these data include any computer program used for operating on the terminal device 700, such as an application 7022. The program for implementing the method of the embodiments of the present disclosure may be included in the application 7022.

The method disclosed in the above embodiments of the present disclosure may be applied to the processor 701 or implemented by the processor 701. The processor 701 may be an integrated circuit chip, has a signal processing capability, the steps of the foregoing method embodiment may be implemented by using a hardware integrated logic circuit in the processor 701 and/or implemented by using an instruction in a software form. The foregoing processor 701 may be a general purpose processor, a digital signal processor (DSP) or another programmable logic device, a transistor logic device, or a discrete hardware component. The processor 701 may implement or execute the methods, steps, and logical block diagrams disclosed in the embodiments of the present disclosure. The general purpose processor may be a microprocessor, or may be any conventional processor, or the like. Steps of the methods disclosed with reference to the embodiments of the present disclosure may be directly executed and completed by means of a hardware decoding processor, or may be executed and completed by using a combination of hardware and software modules in the decoding processor. The software module may be located in a storage medium, and the storage medium is located in the memory 702, and the processor 701 reads information in the memory 702 and completes the steps in the foregoing method embodiments in combination with hardware of the processor.

In an exemplary embodiment, the terminal device 700 may be implemented by one or more application specific integrated circuits (ASIC), DSP, programmable logic devices (PLD), and complex programmable logic devices (CPLD), FPGA, general-purpose processors, controllers, MCUs, MPUs, or other electronic components to implement the aforementioned method.

The embodiments of the present disclosure also provide a computer-readable storage medium for storing computer programs.

Optionally, the computer-readable storage medium may be applied to the terminal device in the embodiments of the present disclosure, and the computer program causes the computer to execute the corresponding process implemented by the terminal device in each method of the embodiments of the present disclosure. For the sake of brevity, no repetition is given here.

The present disclosure is described with reference to flowcharts and/or block diagrams of the methods, the device (system), and the computer program product according to the embodiments of the present disclosure. It should be understood that each process and/or block in the flowchart and/or block diagram, and the combination of processes and/or blocks in the flowchart and/or block diagram may be implemented by computer program instructions. These computer program instructions may be provided to the processor of a general-purpose computer, a special-purpose computer, an embedded processing machine or other programmable data processing devices to generate a machine, so that the instructions executed by the processor of the computer or other programmable data processing devices generate means for realizing the functions specified in one or more processes in the flowchart and/or one or more blocks in the block diagram.

These computer program instructions can also be stored in a computer-readable memory that can guide a computer or other programmable data processing devices to work in a specific manner, so that the instructions stored in the computer-readable memory generate an article of manufacture including the instruction device, and the instruction device realizes the functions specified in one or more processes in the flowchart and/or one or more blocks in the block diagram.

These computer program instructions can also be loaded on a computer or other programmable data processing devices, so that a series of operation steps are executed on the computer or other programmable devices to produce computer-implemented processing, so that instructions executed on the computer or other programmable devices provide steps for implementing the functions specified in one or more processes in the flowchart and/or one or more blocks in the block diagram.

The foregoing descriptions are only the embodiments of the present disclosure and are not used to limit the protection scope of the present disclosure. Any modification, equivalent replacement and improvement, etc. made within the spirit and principle of the present disclosure should be included in the protection scope of the present disclosure.

What is claimed is:

1. A method for downlink data transmission, applied to M physical downlink shared channel (PDSCH) transmissions, where M is larger than or equal to 2, the method comprising:
   determining, by a terminal device, a transmission configuration indicator (TCI) state corresponding to PDSCH transmission based on downlink control information (DCI); and
   determining a redundancy version (RV) value corresponding to the PDSCH transmission based on the DCI, wherein the TCI state and the RV value are used for the terminal device to receive downlink data by the M PDSCH transmissions,
   wherein the determining, by a terminal device, a transmission configuration indicator (TCI) state corresponding to PDSCH transmission based on downlink control information (DCI) comprises:
   determining, by the terminal device, K TCI states based on the TCI state indication information in the DCI, wherein K is greater than 1; and
   determining, according to a code division multiplexing (CDM), group to which a DMRS port belongs, the TCI state corresponding to each DMRS port in each PDSCH transmission in time domain from the K TCI states,
   wherein the DMRS port is indicated by the antenna port indication information in the DCI, wherein the determining, according to a code division multiplexing (CDM), group to which a DMRS port belongs, the TCI state corresponding to each DMRS port in each PDSCH transmission in time domain from the K TCI states, comprises:
   determining the TCI state corresponding to the DMRS port in each PDSCH transmission in time domain according to a third preset strategy, when the number of CDM groups is 1, wherein the third preset strategy comprises at least one of:
   if M is larger than or equal to K, TCI states of the K TCI states are sequentially used in respective PDSCH transmissions from a first TCI state of the K TCI states, and after the K TCI states are all used, the K TCI states are used repeatedly in sequence for the PDSCH transmissions from the first TCI state; and
   if M is less than K, a number of TCI states is selected from the K TCI states, wherein the number of the selected TCI states is same as the transmission number of the downlink data in time domain, and the selected TCI states are sequentially used in respective PDSCH transmissions.

2. The method according to claim 1, further comprising:
   determining, by the terminal device, the transmission number of the downlink data in the time domain based on second indication information transmitted from network device.

3. A terminal device, applied to M physical downlink shared channel (PDSCH) transmissions, where M is larger than or equal to 2, the terminal device comprising:
   a processor; and
   a memory for storing a computer program, wherein the processor is configured to call and run the computer program stored in the memory to:
   determine a transmission configuration indicator (TCI) state corresponding to PDSCH transmission based on downlink control information (DCI); and
   determine a redundancy version (RV) value corresponding to the PDSCH transmission based on the DCI, wherein the TCI state and the RV value are used for the terminal device to receive downlink data by the M PDSCH transmissions, wherein the processor is further configured to:
   determine K TCI states based on the TCI state indication information in the DCI, wherein K is greater than 1; and
   determine, according to a code division multiplexing (CDM), group to which a DMRS port belongs, the TCI state corresponding to each DMRS port in each PDSCH transmission in time domain from the K TCI states, wherein the DMRS port is indicated by the antenna port indication information in the DCI, wherein the processor is further configured to:
   determine the TCI state corresponding to the DMRS port in each PDSCH transmission in time domain according to a third preset strategy, when the number of CDM groups is 1, wherein the third preset strategy comprises at least one of:

if M is larger than or equal to K, TCI states of the K TCI states are sequentially used in respective PDSCH transmissions from a first TCI state of the K TCI states, and after the K TCI states are all used, the K TCI states are used repeatedly in sequence for the PDSCH transmissions from the first TCI state; and if M is less than K, a number of TCI states is selected from the K TCI states, wherein the number of the selected TCI states is same as the transmission number of the downlink data in time domain, and the selected TCI states are sequentially used in respective PDSCH transmissions.

4. The terminal device according to claim 3, wherein the M PDSCH transmissions corresponds to physical downlink shared channels (PDSCH) in multiple slots, or multiple consecutive PDSCH transmission opportunities.

5. The terminal device according to claim 3, wherein the M PDSCH transmissions are exactly the same channel-coded bit data.

6. The terminal device according to claim 3, wherein the M PDSCH transmissions are same data or different bit data taken by a same transmission block (TB) through channel coding.

7. The terminal device according to claim 3, wherein the M PDSCH transmissions correspond to a same hybrid automatic repeat request (HARQ) process.

8. A network device, applied to M physical downlink shared channel (PDSCH) transmissions, where M is larger than or equal to 2, the network device comprising:
a processor; and
a memory for storing a computer program that, when being executed by the processor, causes the network device to:
send downlink control information (DCI) to a terminal device, wherein the downlink control information (DCI) is used for the terminal device to determine a transmission configuration indicator (TCI) state corresponding to PDSCH transmission and to further determine a redundancy version (RV) value corresponding to the PDSCH transmission; and
send downlink data by the M PDSCH transmissions to the terminal device based on the TCI state and the RV value, wherein
K TCI states are determined by the terminal device based on the TCI state indication information in the DCI, wherein K is greater than 1;
the TCI state corresponding to each DMRS port in each PDSCH transmission in time domain is determined from the K TCI states according to a code division multiplexing (CDM), group to which a DMRS port belongs, wherein the DMRS port is indicated by the antenna port indication information in the DCI; and
the TCI state corresponding to the DMRS port in each PDSCH transmission in time domain is determined according to a third preset strategy, when the number of CDM groups is 1, wherein the third preset strategy comprises at least one of:

if M is larger than or equal to K, TCI states of the K TCI states are sequentially used in respective PDSCH transmissions from a first TCI state of the K TCI states, and after the K TCI states are all used, the K TCI states are used repeatedly in sequence for the PDSCH transmissions from the first TCI state; and if M is less than K, a number of TCI states is selected from the K TCI states, wherein the number of the selected TCI states is same as the transmission number of the downlink data in time domain, and the selected TCI states are sequentially used in respective PDSCH transmissions.

9. The network device according to claim 8, wherein the computer program, when being executed by the processor, further causes the network device to:
send second indication information to the terminal device, wherein the second indication information is used for the terminal device to determine the transmission number of the downlink data in time domain.

10. The method according to claim 1, wherein the determining a redundancy version (RV) value corresponding to the PDSCH transmission based on the DCI comprises:
determining the RV value corresponding to each PDSCH transmission based on a correspondence of RV values and the number of PDSCH transmissions in RV indication information in the DCI.

11. The method according to claim 1, wherein K=2.

12. The method according to claim 1, wherein M=2 or M=4.

13. The method according to claim 1, wherein the M PDSCH transmissions correspond to physical downlink shared channels (PDSCH) in multiple slots, or multiple consecutive PDSCH transmission opportunities.

14. The method according to claim 1, wherein the M PDSCH transmissions are exactly same channel-coded bit data.

15. The method according to claim 1, wherein the M PDSCH transmissions are same data or different bit data taken by a same transmission block (TB) through channel coding.

16. The method according to claim 1, wherein the M PDSCH transmissions correspond to a same hybrid automatic repeat request (HARD) process.

17. The terminal device according to claim 3, wherein the processor is further configured to:
determine the RV value corresponding to each PDSCH transmission based on a correspondence of RV values and the number of PDSCH transmissions in RV indication information in the DCI.

18. The terminal device according to claim 3, wherein K=2.

19. The terminal device according to claim 3, wherein M=2 or M=4.

20. The terminal device according to claim 3, wherein the processor is further configured to:
determine the transmission number of the downlink data in time domain based on second indication information transmitted from a network device.

* * * * *